United States Patent [19]

Mondine et al.

[11] Patent Number: 5,213,064
[45] Date of Patent: May 25, 1993

[54] ANIMAL BATH APPARATUS HAVING MULTIPLE SPRAY ASSEMBLIES

[76] Inventors: Patricia Mondine, 266 Noble Ave., Pittsburgh, Pa. 15205; Mary J. Hilarzewski, 280 Lemoyne Ave., Pittsburgh, Pa. 15228

[21] Appl. No.: 867,323

[22] Filed: Apr. 13, 1992

[51] Int. Cl.⁵ .............................................. A01K 13/00
[52] U.S. Cl. ...................................... 119/158; 4/567; 119/159
[58] Field of Search .............. 119/158, 159; 4/567, 4/568, 569, 606, 615, 624, 628; 15/244.1

[56] References Cited

U.S. PATENT DOCUMENTS

| | | | |
|---|---|---|---|
| 1,840,812 | 1/1934 | Hardy | 4/615 |
| 1,962,793 | 6/1934 | Vogel | 4/615 |
| 1,964,387 | 6/1934 | Sena | 4/569 |
| 1,994,413 | 3/1935 | Webster | 4/569 |
| 4,020,796 | 5/1977 | Grifa | 119/158 |
| 4,478,176 | 10/1984 | James | 119/159 |
| 4,549,502 | 10/1985 | Namdari | 119/158 |
| 4,836,144 | 6/1989 | Cole | 119/158 |

FOREIGN PATENT DOCUMENTS 2543795 10/1984 France ........................ 119/158

Primary Examiner—John J. Wilson
Assistant Examiner—Todd E. Manahan
Attorney, Agent, or Firm—S. Michael Bender

[57] ABSTRACT

A portable animal bath apparatus includes a housing in which the animal is confined, a hand held shower device, and a moveable spray device positionable under the animal. The housing includes two half doors for facilitating ingress and egress of the animal, and the housing is narrow enough to confine the animal so as to limit its movement. The lower spray device may be attached to a flexible tube and includes a sponge attached to an end of the tube so that random whipping action of the tube causes a continuous washing motion to occur.

3 Claims, 5 Drawing Sheets

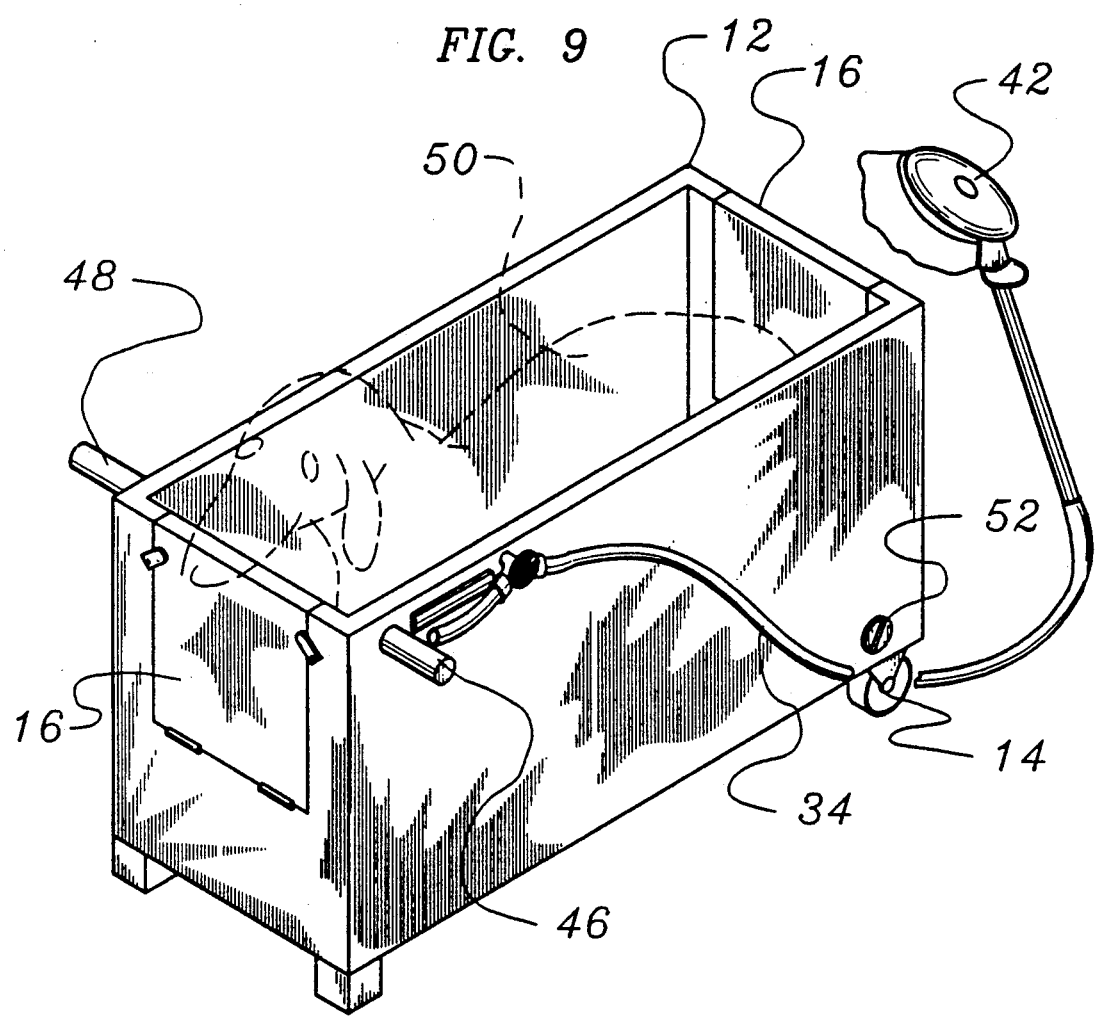

5,213,064

ANIMAL BATH APPARATUS HAVING MULTIPLE SPRAY ASSEMBLIES

BACKGROUND OF THE INVENTION

1. Field of the Invention

The present invention relates to pet bathing apparatuses, and more particularly pertains to a portable pet bathing apparatus wherein means are provided for simultaneously washing and rinsing the top and bottom of the pet.

2. Description of the Prior Art

Various forms of pet bathing devices have been proposed and disclosed in the prior art. For example, U.S. Pat. No. 4,741,289, which issued to T. Blose on May 3, 1988, discloses a dog shower which includes independent side spray grid members that are removeably attached to opposite sides of a shallow fiberglass base. An additional top spray grid is removeably connected on top of the side grids, and plural spaced-apart spray tubes within each grid provide a large spray area for washing and rinsing a dog or other domestic animal. Each of the side and top spray grids are formed from PVC piping thereby making the entire apparatus lightweight and easily transportable. Each spray grid provides a complete spray coverage of a large area and because separate spray grids are provided both above and on each side of the animal, the showering process is simplified and shortened.

Another small animal washing device is disclosed in U.S. Pat. No. 4,930,453 which issued to D. Laliberte on Jun. 5, 1990. The device disclosed in this patent includes a base having a floor sloping towards a drain, and a dome formed from a transparent material is removably retained on the base. An opening formed in one end of the dome is dimensioned to receive a small animal's head through a slit in a rubber sheet covering the opening. A plurality of circular apertures are provided in the dome to receive a pair of glove inserts in various locations for conveniently washing an animal within the dome.

Both of these above-mentioned patents are representative of the many prior art bathing structures for dogs, cats, and other small animals. They are functional for their intended purposes and operate in an efficient manner; however, for various unknown reasons, none of these devices appear to be commercially available at the present time.

As such, there is a continuing need for new and improved bathing apparatuses which can be efficiently and economically manufactured and in this respect, the present invention substantially fulfills this need.

SUMMARY OF THE INVENTION

In view of the foregoing disadvantages inherent in the known types of animal baths now present in the prior art, the present invention provides an improved animal bath construction wherein the same can be utilized to wash both the top and bottom areas of an animal simultaneously. As such, the general purpose of the present invention, which will be described subsequently in greater detail, is to provide a new and improved animal bath and method which has all the advantages of the prior art and none of the disadvantages.

To attain this, the present invention essentially comprises a portable animal bath apparatus that includes a housing in which the animal is confined, a hand held shower device, and a moveable spray device positionable under the animal. The housing includes two half doors for facilitating ingress and egress of the animal, and the housing is narrow enough to confine the animal so as to limit its movement. The lower spray device may be attached to a flexible tube and includes a sponge attached to an end of the tube so that a random whipping action of the tube causes a continuous washing motion to occur.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved animal bath which has all the advantages of the prior art animal baths and none of the disadvantages.

It is another object of the present invention to provide a new and improved animal bath which may be easily and efficiently manufactured and marketed.

It is a further object of the present invention to provide a new and improved animal bath which is of a durable and reliable construction.

An even further object of the present invention is to provide a new and improved animal bath which is susceptible of a low cost of manufacture with regard to both materials and labor, and which accordingly is then susceptible of low prices of sale to the consuming public, thereby making such animal baths economically available to the buying public.

Still yet another object of the present invention is to provide a new and improved animal bath which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 9 is a perspective view of the invention.

DESCRIPTION OF THE PREFERRED EMBODIMENT

Figure 1:
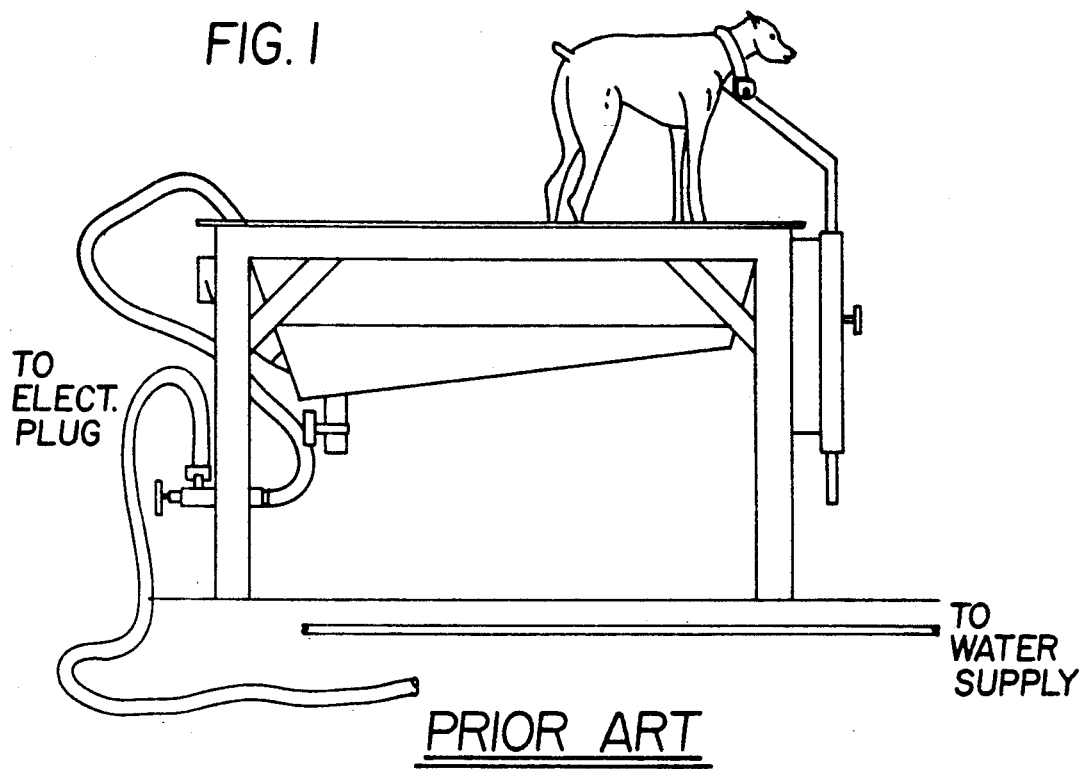
FIG. 1 is a side elevation view of a prior art dog washing structure.

With reference now to the drawings, and in particular to FIGS. 3-6 thereof, a new and improved dog bath assembly embodying the principles and concepts of the present invention and generally designated by the reference numeral 10 will be described.

Figure 2:
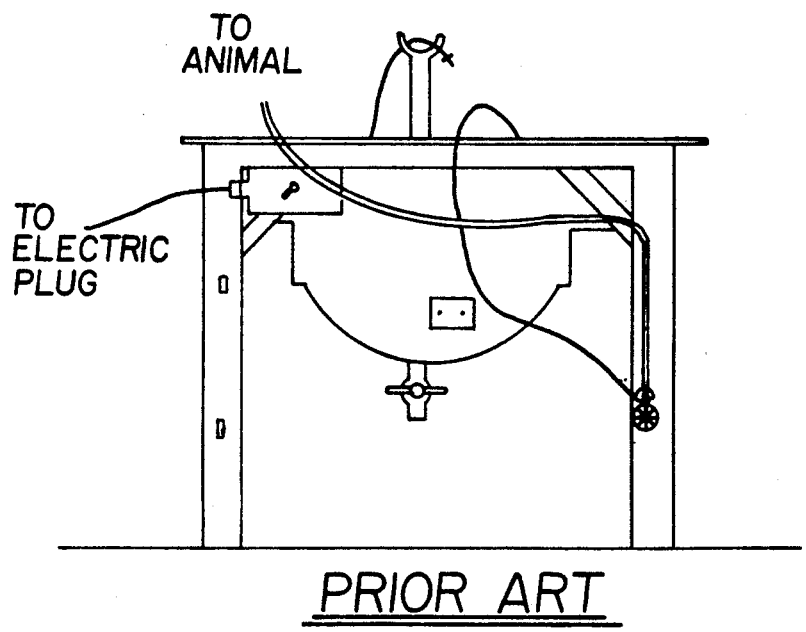
FIG. 2 is an end elevation view of the prior art structure.

Initially however, reference is made to FIGS. 1 and 2 of the drawings wherein the prior art dog bath of the type shown in U.S. Pat. No. 4,836,144, which issued to J. Cole on Jun. 6, 1989, is disclosed. The apparatus and method shown in this patent are representative of the state of the art of dog baths and illustrates the fact that most dog baths do not facilitate a sufficient animal restraint mechanism, as well as a means for simultaneously washing and cleaning the underside of an animal. Further, the structures are quite frequently substantially complex and expensive to make although the bath shown in this patent is quite functional and reliable for its intended purpose.

As shown in FIGS. 3-6, it can be seen that the animal bath 10 comprising the present invention includes a rectangularly-shaped housing or tub 12 which is of a portable design and which includes wheels 14 on one end thereof so as to facilitate moving the bath to any desired location. A hinged door 16 is provided on one end of the tub 12 wherein such door folds downwardly to permit access by an animal to an interior portion of the tub. The hinged door 16 includes a pair of bottomly positioned hinges 18, 20 which facilitate its pivotal movement and further includes a pair of rotatable locking knobs 22, 24 which may be pivoted into a locking position so as to hold the door closed. An identical door assembly is located at the opposite end of the tub 12, and no discussion relative to this identical door assembly will be provided.

Mounted through a side wall of the tub 12 is a conduit 26 having an enclosed water flow control valve operated by a valve wheel 28. A V-shaped conduit 30 extends out of the valve holding conduit 26 whereby a flexible hose 32 may be attached thereto to provide a supply of water from a conventional source in a known manner. Additionally, a further flexible hose 34 may be attached to the V-shaped conduit 30 wherein this further flexible hose can be used to spray water upwardly on an animal retained within the tub 12.

When the valve handle 28 is in an opened position, water can flow from the hose 32 through the conduit 26 into a further flexible conduit 36 mounted interiorly of the tub 12. Under these circumstances, water inflow from the flexible hose 32 is provided both to the hose 36 and the topmost mounted water spray hose 34. No means are provided for stopping the water flow to the hose 34 other than by controlling the water flow at a remote location through the delivery hose 32.

Figure 8:
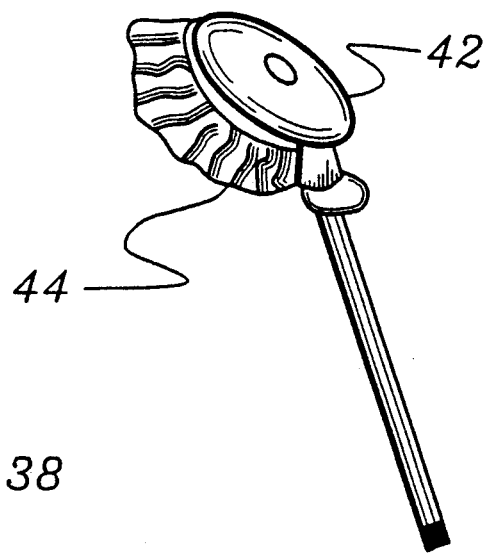
FIG. 8 is a perspective view of a washing brush utilizable with the invention.
Figure 7:
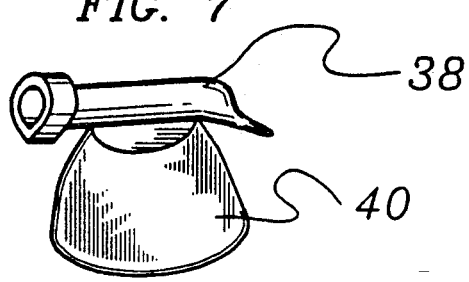
FIG. 7 is a perspective view of a soap dispensing apparatus utilizable with the present invention.

FIGS. 7 and 8 disclose two cleaning devices which can be attached to the water outflow hose 34. In this regard, a water spray nozzle 38 is utilizable with the hose 34 and such nozzle can include an attached container 40 in which a supply of liquid soap can be retained. As water flows through the nozzle 38, some of the soap contained within the container 40 will mix with the water so as to provide a soapy spray for washing an animal. FIG. 8 shows a water dispensing brush 42 which may be threadably attached to the water washing hose 34 and which includes water dispensing orifices retained within a brush section 44 whereby an animal can be brushed and washed simultaneously.

To understand the manner of usage of the present invention 10, reference is made to FIG. 9 of the drawings wherein it can be seen that the tub 12 can be moved to a chosen location by means of the wheels 14 and a pair of lifting handles 46, 48. An animal 50 can then be positioned within the tub 12 by opening either one or both of the end-positioned access doors 16 and with the doors closed, the animal is trapped within the tub. Water can then be directed through the water spray hose 34 to a cleaning device of choice, such as the cleaning brush 42, and a drain plug 52 may be used to remove dirty water from the tub.

Figure 3:
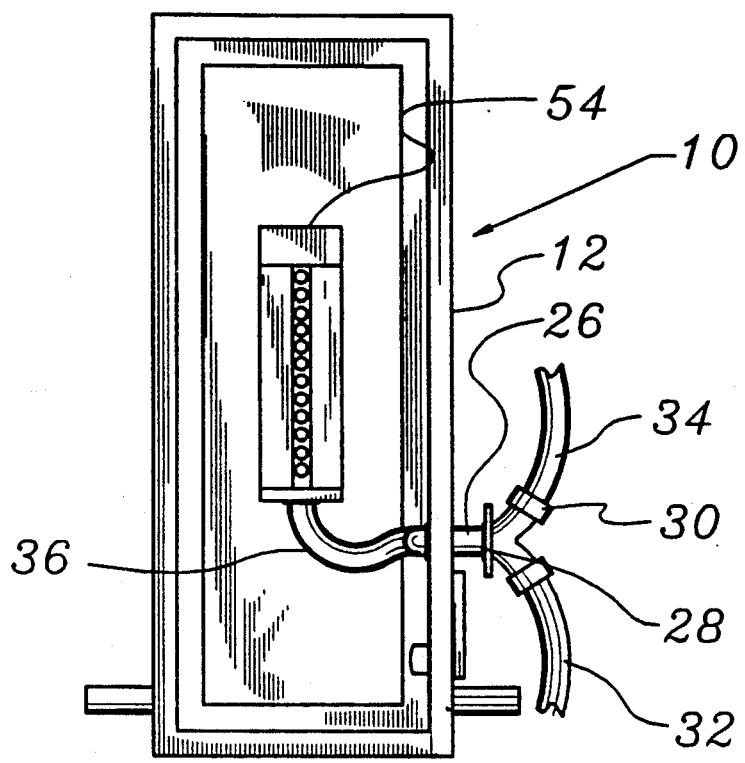
FIG. 3 is a top plan view of the animal bath comprising the present invention.
Figure 4:
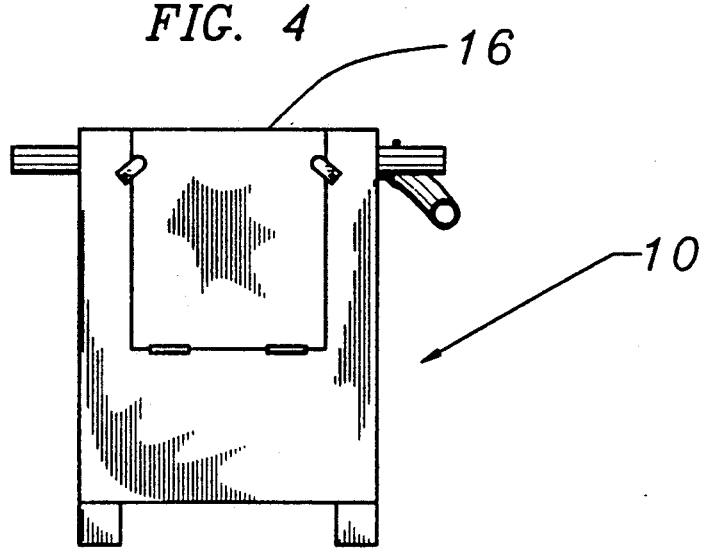
FIG. 4 is an end elevation view of the invention.
Figure 5:
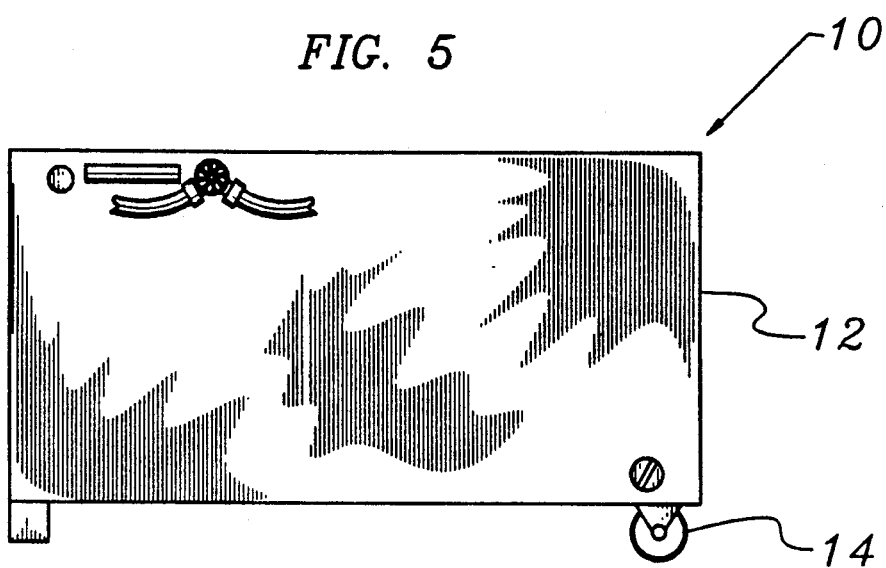
FIG. 5 is a side elevation view of the invention.
Figure 6:
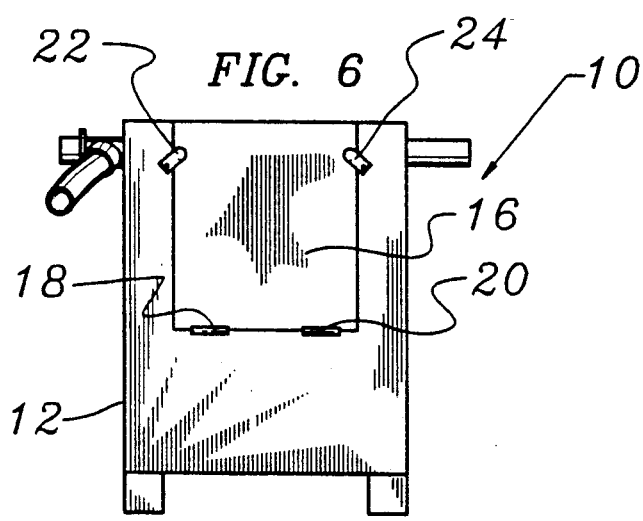
FIG. 6 is an opposite end view of the invention.
Figure 10:
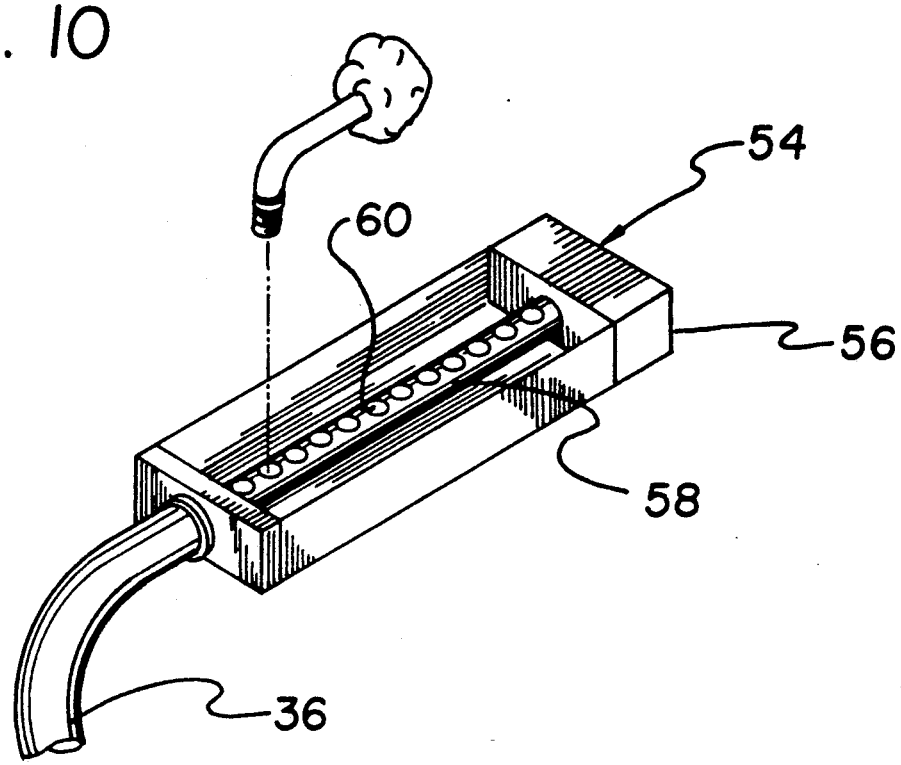
FIG. 10 is a perspective view of the interior spray assembly utilizable with the invention.
Figure 11:
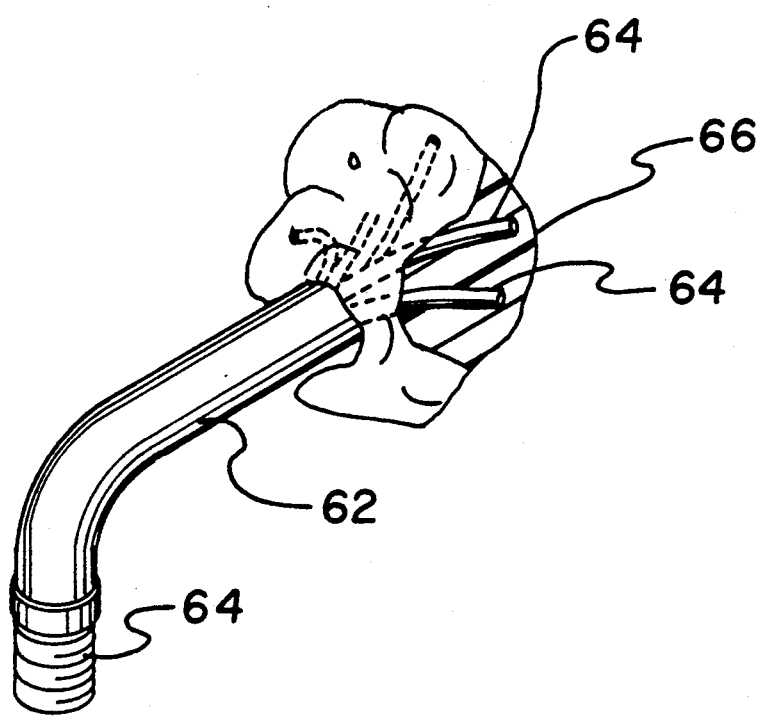
FIG. 11 is a perspective view of a flexible washing arm utilizable with the invention.

FIGS. 10 and 11 disclose the bottom spraying assembly 54 which is positionable within the tub 12 as shown in FIG. 3. The bottom spray assembly 54 includes a rectangular housing 56 and an interiorly positioned spray pipe 58 having a plurality of upwardly extending apertures 60. Plugs may be provided in these apertures 60 to define which ones allow water to spray therethrough with the conduit 58 then being in fluid communication with the water delivery hose 36 as also shown in FIG. 3.

With all of the apertures 60 unplugged, a continual spray of water will be directed upwardly beneath an animal 50. However, it may be desirable to plug a number of the apertures 60 and to insert a length of flexible tubing 62 which has a threaded end 64 attachable to any one of the selected apertures 60. A spray of water is delivered upwardly through the conduit 62 and outwardly through a plurality of smaller conduits 64 imbedded within a section of sponge material 66. The sponge material 66 remains wet during the washing process and operates to clean beneath an animal 50 as the tubing 62 allows the sponge to move erratically about. This erratic movement is facilitated by water spraying out of the plurality of small tubular members 64 retained within the sponge 66. As can be appreciated, this erratic movement of the sponge 66 substantially washes and cleans an entire undersurface of an animal 50 while rinsing away the undesired dirt and accumulated soap.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved bath apparatus for an animal comprising:

housing means in which said animal may be confined:

access door means forming a part of said door means, said access door means facilitating an egree and ingress of said animal to said housing means;

first washing means mounted exteriorly of said housing means and facilitating a washing of a top area of said animal; and second washing means mounted interiorly of said housing means and facilitating a washing of a bottom area of said animal;

wherein said second washing means includes a spray assembly positionable beneath said animal, said spray assembly has at least one flexible washing arm attached thereto, said at least one flexible washing arm includes a flexible conduit through which water is delivered and further includes a sponge member attached to an end of said flexible conduit, and wherein said flexible conduit branches out into a plurality of smaller flexible conduits, said smaller flexible conduits being mounted in said sponge member.

2. The new and improved bath apparatus for an animal comprising:

housing means in which said animal may be confined, said housing means comprising a bottom, a pair of opposed side walls, a pair of opposed end walls and an open top;

access door means, said access door means comprising at least one door hingedly supported on one of said opposed end walls to facilitate an egress and ingress of said animal into said housing means;

valve means having an input connected to a source of washing fluid, said valve means being mounted exteriorly on one of said opposed side walls, said valve means further having a pair of outputs, one of said outputs extending through said one side wall and being connected to a first washing fluid spray assembly mounted on said bottom and being adapted to direct a spray of washing fluid upwardly against a bottom area of an animal placed in said housing means through said at least one door, the other of said outputs being connected to a flexible conduit having a free end, and a second washing fluid spray assembly connected to said flexible conduit free end and being adapted to direct a spray of said washing fluid against a top area of said animal through the open end of said housing means.

3. The invention of claim 2 wherein said housing means further includes wheel means on said bottom thereof and handle means on at least one of said opposed side walls so that said housing means is portable and may be wheeled proximal to a source of washing fluid to be connected to said input of said valve means.

* * * * *